US010647883B2

(12) United States Patent
Yun et al.

(10) Patent No.: US 10,647,883 B2
(45) Date of Patent: *May 12, 2020

(54) POLYIMIDE-BASED SOLUTION AND POLYIMIDE-BASED FILM PRODUCED USING SAME

(71) Applicant: LG CHEM, LTD., Seoul (KR)

(72) Inventors: Cheolmin Yun, Daejeon (KR); BoRa Shin, Daejeon (KR); Hye Won Jeong, Daejeon (KR); Kyungjun Kim, Daejeon (KR); HangAh Park, Daejeon (KR)

(73) Assignee: LG CHEM. LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,603

(22) Filed: Oct. 31, 2018

(65) Prior Publication Data

US 2019/0062590 A1 Feb. 28, 2019

Related U.S. Application Data

(63) Continuation of application No. 15/027,533, filed as application No. PCT/KR2015/005478 on Jun. 1, 2015, now Pat. No. 10,144,847.

(30) Foreign Application Priority Data

| May 30, 2014 | (KR) | 10-2014-0065868 |
| Sep. 29, 2014 | (KR) | 10-2014-0130072 |
| Feb. 9, 2015 | (KR) | 10-2015-0019715 |

(51) Int. Cl.
*C09D 179/08* (2006.01)
*C08G 73/10* (2006.01)
*C08J 5/18* (2006.01)

(52) U.S. Cl.
CPC ....... *C09D 179/08* (2013.01); *C08G 73/1003* (2013.01); *C08G 73/1032* (2013.01); *C08G 73/1039* (2013.01); *C08G 73/1053* (2013.01); *C08G 73/1071* (2013.01); *C08G 73/1078* (2013.01); *C08J 5/18* (2013.01); *C08J 2379/08* (2013.01)

(58) Field of Classification Search
CPC .................................................. C09D 179/08
See application file for complete search history.

(56) References Cited

U.S. PATENT DOCUMENTS

| 4,661,650 A | 4/1987 | Landis et al. |
| 4,923,954 A | 5/1990 | Klobucar et al. |
| 4,956,451 A | 9/1990 | Eisenbraun et al. |
| 5,202,412 A | 4/1993 | Auman et al. |
| 6,067,139 A | 5/2000 | Bohm et al. |
| 7,348,373 B2 | 3/2008 | Dueber et al. |
| 8,466,252 B2 | 6/2013 | Hasegawa |
| 10,144,847 B2* | 12/2018 | Yun ............... C08J 5/18 |
| 2002/0010311 A1 | 1/2002 | Edman et al. |
| 2005/0154181 A1 | 7/2005 | Dueber et al. |
| 2010/0207293 A1 | 8/2010 | Nakayama et al. |
| 2012/0051802 A1 | 3/2012 | Inagaki et al. |
| 2012/0123079 A1 | 5/2012 | Ungerank et al. |
| 2014/0316074 A1 | 10/2014 | Park et al. |

FOREIGN PATENT DOCUMENTS

| CN | 1184123 A | 6/1998 |
| CN | 1211743 A | 3/1999 |
| CN | 101343362 A | 1/2009 |
| CN | 101717648 A | 6/2010 |
| CN | 101851332 A | 10/2010 |
| CN | 102219900 A | 10/2011 |
| EP | 0 768 559 A1 | 4/1997 |
| EP | 2 186 848 A1 | 5/2010 |
| JP | 1989-247430 A | 10/1989 |
| JP | 1989-318038 A | 12/1989 |
| JP | 2003-041003 A | 2/2003 |
| JP | 2006-137881 A | 6/2006 |
| JP | 2007-231224 A | 9/2007 |
| JP | 2015-193852 A | 11/2015 |
| KR | 10-2004-0012783 A | 2/2004 |
| KR | 10-2011-0004537 A | 1/2011 |
| KR | 10-2012-0117791 A | 10/2012 |
| KR | 10-2013-0110589 A | 10/2013 |
| TW | 567211 B | 12/2003 |
| TW | 201418327 A | 5/2014 |
| WO | 2009/038205 A1 | 3/2009 |
| WO | 2013/047451 A1 | 4/2013 |
| WO | 2014/111998 A1 | 7/2014 |

OTHER PUBLICATIONS

D. Miyazaki, "Experimental Data(Exhibit 2)" Toray Industries, Jan. 10, 2019 (26 pages).
"ICSC-1573 Propylene Glycol Monoethyl Ether" retrieved from http://www.nihs.go.jp/ICSC/icssj-c/icss1573c.html (4 pages), Oct. 2004.
"No. 99-22, CAS 108-94-1, (Cyclohexanone)", Existing chemical substance safety (hazard) evaluation sheet (abstract), retrieved from http://www.cerij.or.jp/evaluation_document/hazard/S99_22.pdf, with English abstract (5 pages).
"ICSC_0425, Cyclohexanone", retrieved from http://www.ilo.org/dyn/icsc/showcard.display?p_card_id=0425&p_version=2&p_lang=ja (4 pages), Apr. 2004.
Partition Coefficient Test, National Institute of Technology and Evaluation, retrieved from https://www.nite.go.jp/chem/kasinn/s61/kasinhou02test3.html, with English abstract (8 pages).

(Continued)

*Primary Examiner* — Michael F Pepitone
(74) *Attorney, Agent, or Firm* — Rothwell, Figg, Ernst & Manbeck, P.C.

(57) ABSTRACT

The present invention relates to a polyimide-based solution that can be used to produce an isotropic transparent polyimide-based film with high heat resistance and excellent mechanical properties as well as high transmittance. A coating of the polyimide-based solution on a substrate has a haze of 1% or less after storage at a temperature of 30° C. and a humidity of 70% for 30 minutes.

20 Claims, 2 Drawing Sheets

(56) References Cited

OTHER PUBLICATIONS

Opposition against the Japanese Patent Application No. 2016-544304 (Japanese Patent No. 6368961) issued on Jan. 30, 2019 (69 pages).
International Search Report issued in International Application No. PCT/KR2015/005478 dated Jul. 15, 2015, 2 pages.
Kim et al. "Comparison of Colorless and Transparent Polyimide Films with Various Amine Monomers," Appl. Chem. Eng., vol. 23, No. 3, Jun. 2012, pp. 266-270, with English abstract (6 pages).
Office Action issued for Chinese Patent Application No. 201580002199.4 dated Dec. 7, 2016, 6 pages.
Office Action issued for Korean Patent Application No. 10-2015-0019715 dated Jun. 1, 2017, 5 pages.
Submission of prior art filed for Japanese Patent Application No. 2016-544304 on Jul. 5, 2017, 1 page.
Notice of Submission of prior art filed for Japanese Patent Application No. 2016-544304 on Aug. 1, 2017, 1 page.
Safety Data Sheet (SDS) of methyl isobutyl ketone (MIBK) by Sankyo Chemical Co., Ltd., 11 pages.
Safety Data Sheet (SDS) of methyl isobutyl ketone (MIBK) by Kishida Chemical Co.,Ltd., 9 pages.
Search Report issued in European Patent Application No. 15 799 389.0 dated Jan. 8, 2018, 10 pages.
Office Action issued for Japanese Patent Application No. 2016-544304 dated Jan. 31, 2017, 4 pages.

\* cited by examiner

POLYIMIDE-BASED SOLUTION AND POLYIMIDE-BASED FILM PRODUCED USING SAME

This application is a continuation of U.S. patent application Ser. No. 15/027,533, filed on Apr. 6, 2016, and now granted as U.S. Pat. No. 10,144,847, which is a 35 U.S.C. § 371 National Phase Entry Application form PCT/KR2015/005478, filed on Jun. 1, 2015, and designating the United States, which claims priority under 35 U.S.C. § 119 to Korean Patent Application No. 2014-0065868, filed on May 30, 2014, Korean Patent Application No. 2014-0130072, filed on Sep. 29, 2014, and Korean Patent Application No. 2015-0019715, filed on Feb. 9, 2015, the entire disclosures of which are incorporated herein by reference.

BACKGROUND OF THE INVENTION

1. Field of the Invention

The present invention relates to a polyimide-based solution that can be used to produce an isotropic transparent polyimide-based film with excellent mechanical properties as well as high heat resistance.

2. Description of the Related Art

The fabrication of flexible devices is generally based on high-temperature thin film transistor (TFT) processing. The processing temperatures for the fabrication of flexible devices may vary depending on the kinds of constituent semiconductor layers, insulating films, and barrier layers but TFT processing usually requires a temperature of about 300 to about 500° C. However, the number of polymeric materials capable of withstanding such processing temperatures is extremely limited and polyimides known to have good heat resistance are mainly used for TFT processing.

A flexible device is typically fabricated by applying a polyimide precursor onto a carrier substrate, curing the polyimide precursor to form a film, completing the desired device through subsequent processing steps, and detaching the device from the carrier substrate.

In such fabrication processes, storage stability of the polyimide precursor at room temperature is particularly important. Poor storage stability of the polyimide precursor causes a change in processing viscosity, making the application and curing of the polyimide substrate material unstable. Polyamic acids as polyimide precursors are also known to have poor storage stability due to their structure in which the carboxylic acid groups capable of promoting hydrolysis are adjacent to the amide bonds.

Flexible devices are required to have good heat resistance at high temperatures because their fabrication involves high-temperature processes. Particularly, even organic light emitting diode devices based on low temperature polysilane (LTPSs) processing are often processed at high temperatures close to 500° C. At such temperatures, however, polyimides tend to thermally decompose despite their good heat resistance.

Thus, there is a need to develop a polyimide that can be protected from hydrolysis to achieve good chemical resistance and storage stability and can exhibit good thermal stability at high temperature as well as sufficient mechanical properties, thus being suitable for use in the fabrication of a flexible device.

SUMMARY OF THE INVENTION

It is an object of the present invention to provide a polyimide-based solution that can be used to produce an isotropic transparent polyimide-based film with excellent mechanical properties as well as high heat resistance.

It is a further object to provide a film produced using the polyimide-based solution.

It is another object to provide a device including a substrate produced using the polyimide-based film.

According to one aspect of the present invention, a polyimide-based solution is provided which includes a precursor of a polyimide having a structure of Formula 1:

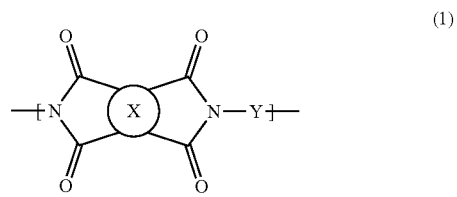

wherein X is a tetravalent organic group derived from an acid dianhydride and Y is a divalent organic group derived from a diamine, or a polyamic acid of Formula 2:

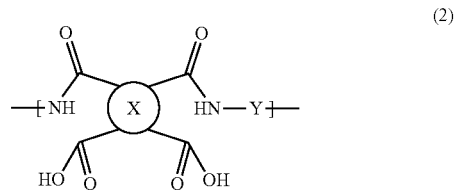

wherein X and Y are as defined in Formula 1, and a solvent wherein a coating of the polyimide-based solution on a substrate has a haze of 1% or less after storage at a temperature of 30° C. and a humidity of 70% for 30 minutes.

According to one embodiment, the solvent may have a positive partition coefficient (Log P) at 25° C.

According to one embodiment, the divalent organic groups may be each independently selected from divalent aromatic organic groups, divalent alicyclic organic groups, divalent aliphatic organic groups, and combinations thereof and the tetravalent organic groups may be each independently selected from tetravalent aromatic organic groups, tetravalent alicyclic organic groups, tetravalent aliphatic organic groups, and combinations thereof.

According to one embodiment, X may include a tetravalent organic group having a fluorine atom-containing substituent, Y may include a divalent organic group having a fluorine atom-containing substituent, or each of X and Y may include an organic group having a fluorine atom-containing substituent.

According to one embodiment, Y in each of the polyimide and the polyamic acid may include both a divalent organic group having a fluorine atom-containing substituent and a divalent organic group having no fluorine atom-containing substituent.

According to one embodiment, the molar ratio of the divalent organic group having a fluorine atom-containing substituent to all divalent organic groups in Y may be from about 0.1:1 to about 1:1.

Y may include a divalent monocyclic or polycyclic aromatic organic group, a divalent monocyclic or polycyclic alicyclic organic group, or a divalent organic group having a structure in which two or more divalent organic groups selected from divalent monocyclic or polycyclic aromatic organic groups and divalent monocyclic or polycyclic alicyclic organic groups are linked to each other via a single bond or a linking group.

The divalent organic group having a fluorine atom-containing substituent may be a divalent monocyclic or polycyclic aromatic organic group, a divalent monocyclic or polycyclic alicyclic organic group, or a divalent organic group having a structure in which two or more divalent organic groups selected from divalent monocyclic or polycyclic aromatic organic groups and divalent monocyclic or polycyclic alicyclic organic groups are linked to each other via a single bond or a linking group, and the fluorine atom-containing substituent may be directly substituted on the aromatic or alicyclic ring or may be substituted on the linking group.

According to one embodiment, the divalent organic group having a fluorine atom-containing substituent may be derived from 2,2'-bis(trifluoromethyl)benzidine or 2,2-bis[4-(-aminophenoxy)phenyl]hexafluoropropane.

According to one embodiment, the divalent organic group having no fluorine atom-containing substituent may be derived from at least one compound selected from 4,4'-oxydianiline, 4,4'-(9-fluorenylidene)dianiline, para-phenylenediamine, and meta-phenylenediamine.

According to one embodiment, X in each of the polyimide and the polyamic acid may include a tetravalent organic group having a fluorine atom-containing substituent and a tetravalent organic group having no fluorine atom-containing substituent.

According to one embodiment, the molar ratio of the tetravalent organic group having a fluorine atom-containing substituent to all tetravalent organic groups in X may be from about 0.1:1 to about 1:1.

X may include a tetravalent monocyclic or polycyclic aromatic organic group, a tetravalent monocyclic or polycyclic alicyclic organic group, or a tetravalent organic group having a structure in which two or more tetravalent organic groups selected from tetravalent monocyclic or polycyclic aromatic organic groups and tetravalent monocyclic or polycyclic alicyclic organic groups are linked to each other via a single bond or a linking group.

The tetravalent organic group having a fluorine atom-containing substituent may be a tetravalent monocyclic or polycyclic aromatic organic group, a tetravalent monocyclic or polycyclic alicyclic organic group, or a tetravalent organic group having a structure in which two or more tetravalent organic groups selected from tetravalent monocyclic or polycyclic aromatic organic groups and tetravalent monocyclic or polycyclic alicyclic organic groups are linked to each other via a single bond or a linking group, and the fluorine atom-containing substituent may be directly substituted on the aromatic or alicyclic ring or may be substituted on the linking group.

According to one embodiment, the tetravalent organic group having a fluorine atom-containing substituent may be derived from 4,4'-(hexafluoroisopropylidene)diphthalic anhydride.

According to one embodiment, the tetravalent organic group having no fluorine atom-containing substituent may be derived from at least one compound selected from 3,3',4,4'-biphenyltetracarboxylic dianhydride, 2,3,3',4'-biphenyltetracarboxylic dianhydride, pyromellitic anhydride, 1,2,4,5-cyclohexanetetracarboxylic dianhydride, 4,4'-oxydiphthalic anhydride, and 2,3,3',4'-oxydiphthalic anhydride.

The polyimide-based solution may have a viscosity of about 400 cP to about 50,000 cP, as measured using a Brookfield rotational viscometer at 25° C.

The present invention also provides a polyimide-based film produced by applying the polyimide-based solution to one side of a substrate, curing the polyimide-based solution to form a polyimide-based film, and separating the polyimide-based film from the substrate.

The polyimide may have a glass transition temperature of at least 250° C. and the film may have a transmittance of at least about 85% to light at a wavelength of 380 to 760 nm in the thickness range of 10 to 30 μm.

The film may have a coefficient of thermal expansion (CTE) of about 70 ppm/K or less at 250° C.

According to one embodiment, the film may have an in-plane retardation ($R_{in}$) of about 0.01 to about 1 nm and a thickness retardation ($R_{th}$) of about 100 nm or less.

According to an alternative embodiment, the film may have a thickness retardation ($R_{th}$) of at least about 100 nm.

According to one embodiment, the film may have a yellowness index (YI) of about 9 or less and a modulus of at least about 1 GPa.

The present invention also provides a display substrate including the polyimide-based film.

The present invention also provides a device including the polyimide-based film.

Details of other embodiments of the present invention are included in the detailed description that follows.

The use of the polyimide-based solution according to the present invention enables the production of a highly transparent polyimide-based film with high heat resistance and excellent mechanical properties. Therefore, the polyimide-based film is suitable for use as a substrate in a solar cell, an organic light emitting diode, a semiconductor device or a flexible display device.

DETAILED DESCRIPTION OF THE INVENTION

Figure 1:
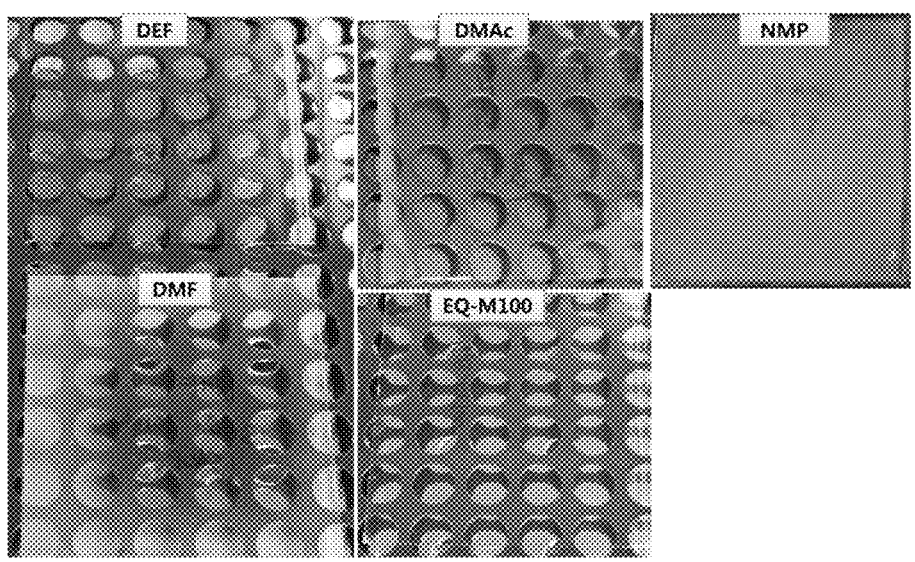
FIG. 1 shows images showing whether polyimide-based solutions prepared in Example 1-1 and Comparative Examples 1-1 to 1-4 were prevented from clouding.

As the present invention allows for various changes and numerous embodiments, particular embodiments will be illustrated in drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, detailed explanations of related art are omitted when it is deemed that they may unnecessarily obscure the essence of the present invention.

Unless otherwise stated, all compounds or functional groups may be substituted or unsubstituted. The term "substituted" used herein means that at least one of the hydrogen atoms contained in the compounds or functional groups is replaced by a substituent selected from the group consisting of halogen atoms, $C_1$-$C_{10}$ alkyl groups, halogenated alkyl groups, $C_3$-$C_{30}$ cycloalkyl groups, $C_6$-$C_{30}$ aryl groups, a hydroxyl group, $C_1$-$C_{10}$ alkoxy groups, a carboxylic acid group, an aldehyde group, an epoxy group, a cyano group, a nitro group, an amino group, a sulfonic acid group, and derivatives thereof.

Unless otherwise mentioned, the term "combination thereof" means that two or more functional groups are bonded to each other via a linking group, such as a single bond, a double bond, a triple bond, a $C_1$-$C_{10}$ alkylene group (e.g., a methylene (—$CH_2$—) or ethylene (—$CH_2CH_2$—) group), a $C_1$-$C_{10}$ fluoroalkylene group (e.g., a fluoromethylene (—$CF_2$—) or perfluoroethylene (—$CF_2CF_2$—) group), a heteroatom, such as N, O, P, S or Si, or a functional group containing the heteroatom (specifically, a heteroalkylene group containing a carbonyl (—C=O—) group, an ether (—O—) group, an ester (—COO—) group, —S—, —NH— or —N=N— in the molecule), or two or more functional groups are fused together.

The term "isotropic" used herein means a thickness retardation ($R_{th}$) of about 100 nm or less and the term "non-isotropic" or "anisotropic" means a thickness retardation ($R_{th}$) of at least about 100 nm.

The term "polyimide-based solution" used herein is intended to include solutions of polyimide precursors, solutions of polyamic acids, and mixtures thereof. The polyimide precursors include polyamic acids but are not limited thereto. The polyimide precursors include those that can be converted to polyimides by subsequent processing.

A polyimide-based solution, a polyimide-based film using the polyimide-based solution, a method for producing the polyimide-based film, and a display substrate and a device including the polyimide-based solution according to embodiments of the present invention will now be described in more detail.

The present invention is directed to a polyimide-based solution which includes a precursor of a polyimide having a structure of Formula 1:

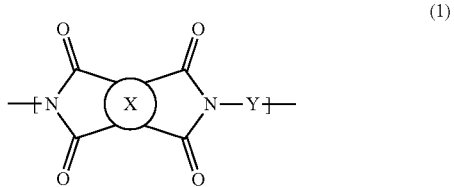

(1)

wherein X is a tetravalent organic group derived from an acid dianhydride and Y is a divalent organic group derived from a diamine, or a polyamic acid of Formula 2:

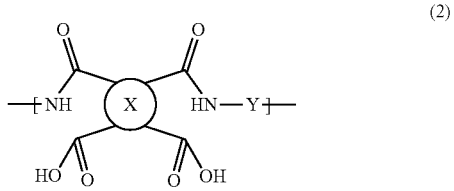

(2)

wherein X and Y are as defined in Formula 1, and a solvent wherein a coating of the polyimide-based solution on a substrate has a haze of 1% or less after storage at a temperature of 30° C. and a humidity of 70% for 30 minutes.

According to one embodiment, the solvent may have a positive partition coefficient (Log P) at 25° C. More specifically, the solvent may have a partition coefficient (Log P) of about 0.01 to about 3, about 0.01 to about 2, about 0.01 to about 1, or about 0.01 to about 0.1.

The partition coefficient can be calculated using an ACD/Log P module of an ACD/Percepta platform available from ACD/Labs. The ACD/Log P module uses an algorithm based on quantitative structure-property relationship methodology using 2D molecular structures.

The positive partition coefficient indicates that the polarity of the solvent is hydrophobic. As a result of intensive research, the inventors have found the fact that a solution of a polyimide precursor in a specific solvent having a positive partition coefficient can be used to produce a highly transparent, isotropic polyimide-based film with high heat resistance and excellent mechanical properties.

According to a preferred embodiment of the present invention, the solvent is a tertiary amine substituted with an alkyl group having two or more carbon atoms. More preferably, the solvent is a tertiary amine having two or more $C_2$-$C_6$ alkyl groups. More specifically, the solvent may be, for example, N,N-diethylacetamide, N,N-diethylformamide or a mixture thereof. N,N-diethylformamide is most preferred.

According to a study conducted by the present inventors, a coating of the polyimide-based solution of the present invention on a glass substrate has a haze of 1% or less after storage at a temperature of 30° C. and a humidity of 70% for 30 minutes and can be prevented from clouding compared to coatings of conventional polyimide-based solutions using other solvents.

The polyamic acid reacts with water to form a salt, which is a cause of clouding. Severe clouding may cause aggregation. Curing of the polyimide-based solution in a cloudy state leads to the production of a film having a rough surface. That is, when the coating of the polyimide-based solution has a high haze, poor coatability is caused, which may increase the surface roughness of the film after curing. Therefore, prevention of the polyimide-based solution from clouding contributes to an improvement in the surface characteristics of the film after curing.

The polyimide of Formula 1 or the polyamic acid of Formula 2 may be prepared using an acid dianhydride including the functional group (X) in Formula 1 or 2 and a diamine including the functional group (Y) in Formula 1 or 2.

The divalent organic groups in Formulae 1 and 2 may be each independently selected from divalent aromatic organic groups, divalent alicyclic organic groups, divalent aliphatic organic groups, and combinations thereof. The tetravalent organic groups in Formulae 1 and 2 may be each independently selected from tetravalent aromatic organic groups, tetravalent alicyclic organic groups, tetravalent aliphatic organic groups, and combinations thereof.

The term "aromatic" used herein refers to a $C_6$-$C_{30}$ monocyclic or polycyclic compound having a structure in which delocalized electrons are shared in the molecule. Preferably, the aromatic refers to a $C_6$-$C_{18}$ monocyclic or polycyclic compound.

The term "alicyclic" is a non-aromatic cyclic compound and refers to a $C_3$-$C_{30}$ monocyclic or polycyclic compound. Preferably, the alicyclic refers to a $C_3$-$C_{18}$ or $C_3$-$C_{12}$ monocyclic or polycyclic compound.

The term "aliphatic" refers to a straight or branched hydrocarbon compound other than aromatic and alicyclic compounds. The aliphatic compound may be, for example, a $C_1$-$C_{30}$, $C_1$-$C_{20}$ or $C_1$-$C_{10}$ hydrocarbon compound.

According to one embodiment, X may include a divalent organic group having a fluorine atom-containing substituent, Y may include a tetravalent organic group having a fluorine atom-containing substituent, or each of X and Y may include an organic group having a fluorine atom-containing substituent.

That is, at least one of X and Y in Formula 1 or 2 may have a fluorine atom-containing substituent. The divalent or the tetravalent organic group having a fluorine atom-containing substituent may be present in an amount of 50 to 70 moles, based on 100 moles of the divalent or tetravalent organic group.

The term "fluorinated substituent" or "fluoro substituent" is intended to include "substituent having a fluorine atom" and "substituent containing a fluorine atom" and is interchangeable with the term "fluorine atom-containing substituent". Preferably, the fluorine atom-containing substituent is a $C_1$-$C_{10}$ or $C_1$-$C_6$ fluoroalkyl group.

According to one embodiment, X in each of the polyimide and the polyamic acid may include both a tetravalent organic group having a fluorine atom-containing substituent and a tetravalent organic group having no fluorine atom-containing substituent. In this embodiment, the molar ratio of the tetravalent organic group having a fluorine atom-containing substituent to all tetravalent organic groups in X may be from about 0.1:1 to about 0.9:1.

X may include a tetravalent monocyclic or polycyclic aromatic organic group, a tetravalent monocyclic or polycyclic alicyclic organic group, or a tetravalent organic group having a structure in which two or more tetravalent organic groups selected from tetravalent monocyclic or polycyclic aromatic organic groups and tetravalent monocyclic or polycyclic alicyclic organic groups are linked to each other via a single bond or a linking group.

The tetravalent organic group having a fluorine atom-containing substituent may be a tetravalent monocyclic or polycyclic aromatic organic group, a tetravalent monocyclic or polycyclic alicyclic organic group, or a tetravalent organic group having a structure in which two or more tetravalent organic groups selected from tetravalent monocyclic or polycyclic aromatic organic groups and tetravalent monocyclic or polycyclic alicyclic organic groups are linked to each other via a single bond or a linking group, and the fluorine atom-containing substituent may be directly substituted on the aromatic or alicyclic ring or may be substituted on the linking group. The kind of the linking group is the same as that explained earlier, and the linking group may have a substituent.

Specifically, the tetravalent organic group (X) may be selected from the group consisting of tetravalent aromatic organic groups of Formulae 2a to 2d, tetravalent alicyclic organic groups including a $C_3$-$C_{12}$ cycloalkane structure, a tetravalent alicyclic organic group of Formula 2e, and tetravalent aliphatic organic groups having a $C_1$-$C_{10}$ branched alkane structure, and combinations thereof:

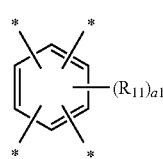

(2a)

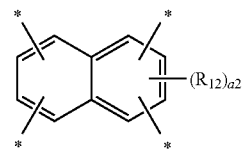

(2b)

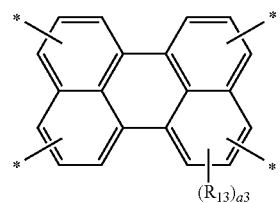

(2c)

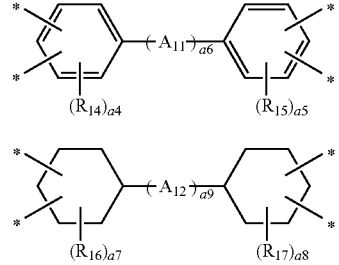

(2d)

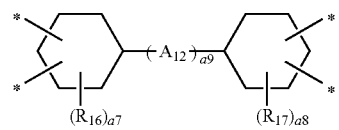

(2e)

wherein $R_{11}$ to $R_{17}$ may be each independently a $C_1$-$C_{10}$ alkyl group or a $C_1$-$C_{10}$ fluoroalkyl group, $a_1$ may be an integer of 0 or 2, $a_2$ may be an integer from 0 to 4, $a_3$ may be an integer from 0 to 8, $a_4$ and $a_5$ may be each independently an integer from 0 to 3, $a_6$ and $a_9$ may be each independently an integer from 0 to 3, $a_7$ and $a_8$ may be each independently an integer from 0 to 9 and $A_{21}$ and $A_{22}$ may be each independently selected from a single bond, —O—, —$CR_{18}R_{19}$—, —C(=O)—, —C(=O)NH—, —S—, —$SO_2$—, a phenylene group, and combinations thereof ($R_{18}$ and $R_{19}$ may be each independently selected from a hydrogen atom, $C_1$-$C_{10}$ alkyl group, and $C_1$-$C_{10}$ fluoroalkyl groups).

More specifically, the tetravalent organic group (X) may be selected from, but not limited to, those of Formulae 3a to 3t:

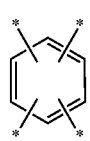

(3a)

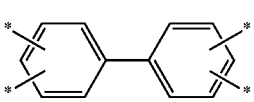

(3b)

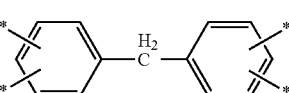

(3c)

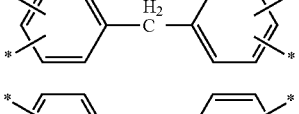

(3d)

-continued
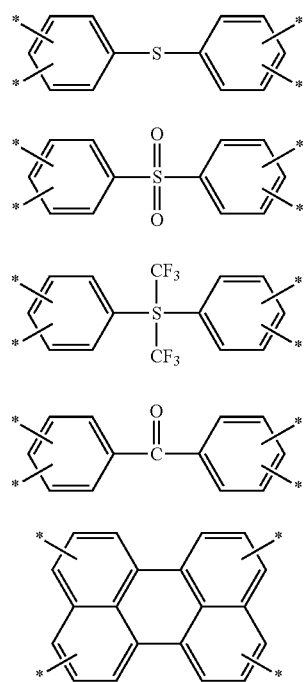
(3e)
(3f)
(3g)
(3h)
(3i)
(3j)
(3k)
(3l)
(3m)
(3n)
(3o)
(3p)
-continued
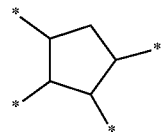
(3q)
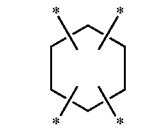
(3r)
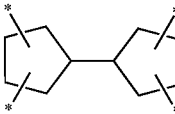
(3s)
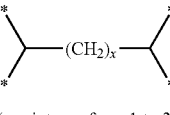
(3t)
(x = integer from 1 to 3)
and those of Formulae 4a to 4l:
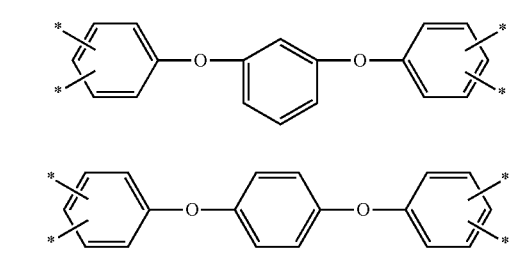
(4a)
(4b)
(4c)
(4d)
(4e)
(4f)

-continued (4g)
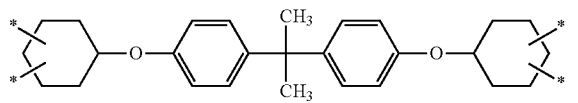

(4h)
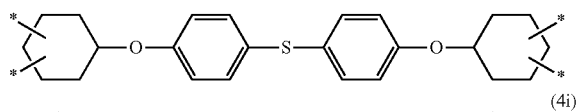

(4i)
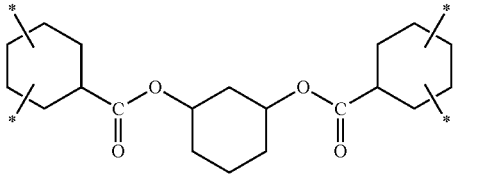

(4j)
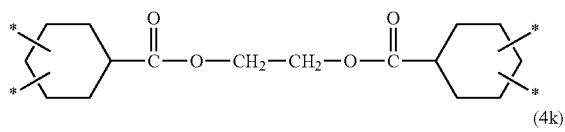

(4k)
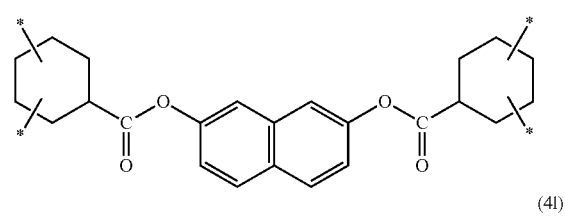

(4l)
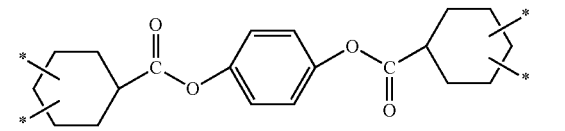

One or more hydrogen atoms present in each of the tetravalent organic groups of Formulae 3a to 3t and Formulae 4a to 4l may also be replaced by $C_1$-$C_{10}$ alkyl groups or $C_1$-$C_{10}$ fluoroalkyl groups.

Specifically, the tetracarboxylic dianhydride including the tetravalent organic group (X) may be butanetetracarboxylic dianhydride, pentanetetracarboxylic dianhydride, hexanetetracarboxylic dianhydride, cyclopentanetetracarboxylic dianhydride, bicyclopentanetetracarboxylic dianhydride, cyclopropanetetracarboxylic dianhydride, cyclohexanetetracarboxylic dianhydride (PMDA-H), pyromellitic dianhydride (PMDA), methylcyclohexanetetracarboxylic dianhydride, 3,3',4,4'-benzophenonetetracarboxylic dianhydride, 3,4,9,10-perylenetetracarboxylic dianhydride, 4,4'-sulfonyldiphthalic dianhydride, 3,3',4,4'-biphenyltetracarboxylic dianhydride, 1,2,5,6-naphthalenetetracarboxylic dianhydride, 2,3,6,7-naphthalenetetracarboxylic dianhydride, 1,4,5,8-naphthalenetetracarboxylic dianhydride, 2,3,5,6-pyridinetetracarboxylic dianhydride, m-terphenyl-3,3',4,4'-tetracarboxylic dianhydride, p-terphenyl-3,3',4,4'-tetracarboxylic dianhydride, 4,4'-oxydiphthalic dianhydride, 1,1,1,3,3,3-hexafluoro-2,2-bis[(2,3- or 3,4-dicarboxyphenoxy)phenylpropane dianhydride, 2,2-bis[4-(2,3- or 3,4-dicarboxyphenoxy)phenyl]propane dianhydride or 1,1,1,3,3,3-hexafluoro-2,2-bis[4-(2,3- or 4-dicarboxyphenoxy)phenyl]propane dianhydride.

Particularly, the tetracarboxylic dianhydride is preferably an aromatic dianhydride, more preferably an aromatic dianhydride having a fluorinated substituent. The aromatic dianhydride allows the polyimide to possess good oxidation resistance upon curing at high temperature while maintaining its transparency.

A dianhydride possessing a fluorinated substituent may also be used together with a dianhydride having no fluorine atom. In this case, the molar ratio of the dianhydride possessing a fluorinated substituent to the dianhydride having no fluorine atom is not limited and may be from 1:9 to 9:1, from 2:8 to 8:2 or from 3:7 to 7:3 but are not limited thereto.

According to one embodiment, the tetravalent organic group having a fluorine atom-containing substituent may be derived from 4,4'-(hexafluoroisopropylidene)diphthalic anhydride.

According to one embodiment, the tetravalent organic group having no fluorine atom-containing substituent may be derived from at least one compound selected from 3,3',4,4'-biphenyltetracarboxylic dianhydride, 2,3,3',4'-biphenyltetracarboxylic dianhydride, pyromellitic anhydride, 1,2,4,5-cyclohexanetetracarboxylic dianhydride, 4,4'-oxydiphthalic anhydride, and 2,3,3',4'-oxydiphthalic anhydride.

A diamine-based compound including the functional group (Y) in Formula 1 or 2 and two amino groups bonded to Y may be used for the preparation of the polyimide.

Specifically, Y in Formula 1 may be a divalent aliphatic, alicyclic or aromatic organic group derived from a diamine compound or a combination thereof in which divalent organic groups selected from divalent aliphatic, alicyclic and aromatic organic groups are directly linked to each other or linked to each other through a crosslinked structure.

Y may include a divalent monocyclic or polycyclic aromatic organic group, a divalent monocyclic or polycyclic alicyclic organic group, or a divalent organic group having a structure in which two or more divalent organic groups selected from divalent monocyclic or polycyclic aromatic organic groups and divalent monocyclic or polycyclic alicyclic organic groups are linked to each other via a single bond or a linking group.

More specifically, the diamine may be 4,4'-diaminodiphenyl ether, 4,4'-diaminodiphenylsulfide, 4,4'-diaminodiphenylsulfone, 4,4'-diaminobenzophenone, bis[4-(4-aminophenoxy)phenyl]methane, 2,2-bis[4-(4-aminophenoxy)phenyl]propane, 2,2-bis[4-(4-aminophenoxy)phenyl]-1,1,1,3,3,3-hexafluoropropane, 1,3-bis(4-aminophenoxy)benzene, 4,4'-bis(4-aminophenoxy)biphenyl, bis[4-(4-aminophenoxy)phenyl]ketone, bis[4-(4-aminophenoxy)phenyl]sulfoxide, bis[4-(4-aminophenoxy)phenyl]sulfone, bis[4-(4-aminophenoxy)phenyl]ether, 4,4'-bis(4-aminophenylsulfonyl)diphenyl ether, 4,4'-bis(4-aminothiophenoxy)diphenylsulfone, 1,4-bis[4-(4-aminophenoxy)benzoyl]benzene, 3,3'-diaminodiphenyl ether, 3,3-diaminodiphenylsulfide, 3,3'-diaminodiphenylsulfone, 3,3'-diaminobenzophenone, bis[4-(3-aminophenoxy)-phenyl]methane, 2,2-bis[4-(3-aminophenoxy)phenyl]propane, 2,2-bis[4-(3-aminophenoxy)phenyl-1,1,1,3,3,3-hexafluoropropane, 1,3-bis(3-aminophenoxy)benzene, 4,4'-bis(3-aminophenoxy)biphenyl, bis[4-(3-aminophenoxy)phenyl]ketone, bis[4-(3-aminophenoxy)phenyl]sulfide, bis[4-(3-aminophenoxy)phenyl]sulfone, bis[4-(3-aminophenoxy)phenyl]ether, 4,4'-bis(3-aminophenylsulfonyl)diphenyl ether, 4,4'-bis(3-aminothiophenoxy)diphenylsulfone, 1,4-bis[4-(3-aminophenoxy)benzoyl]benzene, or a mixture thereof.

A diamine having an aromatic group is preferred because it allows a polyimide-based film to have excellent physical properties.

More specifically, a diamine having a fluorinated substituent would be desirable, particularly when the acid dianhydride has no fluorinated substituent. The fluorinated substituent is the same as that explained previously and is preferably $C_1$-$C_{10}$ fluoroalkyl or $C_1$-$C_6$ fluoroalkyl.

The presence of the fluorinated substituent in the diamine may contribute to an improvement in the transparency of a polyimide film and the substituent having no fluorine atom may contribute to improvements in the chemical resistance, heat resistance and mechanical strength of a polyimide film.

According to one embodiment, Y in each of the polyimide and the polyamic acid may include both a divalent organic group having a fluorine atom-containing substituent and a divalent organic group having no fluorine atom-containing substituent. In this embodiment, the molar ratio of the divalent organic group having a fluorine atom-containing substituent to all divalent organic groups in Y may be from about 0.1:1 to about 0.9:1.

That is, the diamine possessing a fluorinated substituent may also be used together with the diamine having no fluorine atom. In this case, the molar ratio of the diamine possessing a fluorinated substituent to the diamine having no fluorine atom is not limited and may be from 1:9 to 9:1, from 2:8 to 8:2 or from 3:7 to 7:3.

The divalent organic group having a fluorine atom-containing substituent may be a divalent monocyclic or polycyclic aromatic organic group, a divalent monocyclic or polycyclic alicyclic organic group, or a divalent organic group having a structure in which two or more divalent organic groups selected from divalent monocyclic or polycyclic aromatic organic groups and divalent monocyclic or polycyclic alicyclic organic groups are linked to each other via a single bond or a linking group, and the fluorine atom-containing substituent may be directly substituted on the aromatic or alicyclic ring or may be substituted on the linking group. The kind of the linking group is the same as that described above.

According to one embodiment, the divalent organic group having a fluorine atom-containing substituent may be one derived from 2,2'-bis(trifluoromethyl)benzidine or 2,2-bis[4-(-aminophenoxy)phenyl]hexafluoropropane.

According to one embodiment, the divalent organic group having no fluorine atom-containing substituent may be derived from at least one compound selected from 4,4'-oxydianiline, 4,4'-(9-fluorenylidene)dianiline, para-phenylenediamine, and meta-phenylenediamine.

According to one embodiment, the polyimide may be prepared by polymerization of the acid dianhydride and the diamine, followed by imidization, and may include a structure of Formula 5:

wherein p, q, and r represent the numbers of moles of the corresponding repeating units and satisfy the relations of p+q+r=1, 0≤p≤0.9, 0.1≤q≤0.9, and 0≤r≤0.9, with the proviso that p and r are not simultaneously 0, $X_1$ to $X_3$ are each independently a tetravalent organic group including an aromatic, alicyclic or aliphatic group derived from the acid dianhydride, or a combination thereof, and $Y_1$ to $Y_3$ are each independently a divalent organic group including an aromatic, alicyclic or aliphatic group derived from the diamine, or a combination thereof.

According to one embodiment, $X_1$ to $X_3$ may be each independently a $C_6$-$C_{18}$ tetravalent monocyclic or polycyclic aromatic organic group, a $C_6$-$C_{18}$ tetravalent monocyclic or polycyclic alicyclic organic group, or a tetravalent organic group having a structure in which two or more tetravalent organic groups selected from tetravalent monocyclic or polycyclic aromatic organic groups and tetravalent monocyclic or polycyclic alicyclic organic groups are linked to each other via a single bond or a linking group.

According to one embodiment, $Y_1$ to $Y_3$ may be each independently a $C_6$-$C_{18}$ divalent monocyclic or polycyclic aromatic organic group, a $C_6$-$C_{18}$ divalent monocyclic or polycyclic alicyclic organic group, or a divalent organic group having a structure in which two or more divalent organic groups selected from divalent monocyclic or polycyclic aromatic organic groups and divalent monocyclic or polycyclic alicyclic organic groups are linked to each other via a single bond or a linking group.

According to a preferred embodiment, one or more of $X_1$ to $X_3$ or one or more of $Y_1$ to $Y_3$ may have a fluorinated substituent. The fluorinated substituent may be directly substituted on the aromatic or alicyclic ring or may be substituted on the linking group. The acid dianhydride and the diamine with or without a fluorinated substituent are the same as those described above.

According to one embodiment, $X_1$ to $X_3$ in Formula 5 are tetravalent organic groups derived from 4,4'-(hexafluoroisopropylidene)diphthalic anhydride.

$Y_1$ may be a divalent organic group derived from an aromatic diamine having a fluorinated substituent and $Y_2$ and $Y_3$ may be each independently a divalent organic group derived from an aromatic diamine having no fluorinated substituent.

Specifically, $Y_1$ may be a divalent organic group derived from 2,2'-bis(trifluoromethyl)benzidine.

$Y_2$ and $Y_3$ may be each independently a divalent organic group derived from p-phenylenediamine, m-phenylenediamine, 4,4'-diaminodiphenyl ether or 4,4'-(9-fluorenylidene)dianiline.

According to a preferred embodiment, p, q, and r in Formula 5 satisfy the relation of 0.3≤p/(p+q+r)≤0.7.

$Y_2$ may be a divalent organic group derived from p-phenylenediamine, m-phenylenediamine, 4,4'-diaminodiphenyl ether or a combination thereof and $Y_3$ may be a divalent

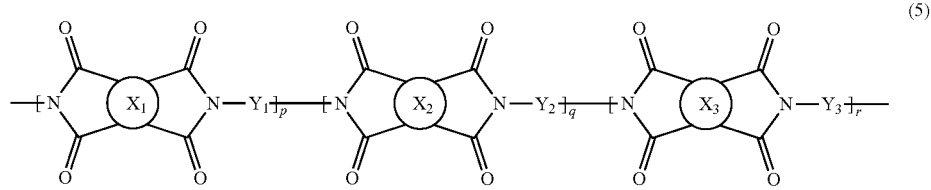

(5)

organic group derived from 4,4'-(9-fluorenylidene)dianiline. Preferably, r/(p+q+r) is not greater than 0.3 or not greater than 0.2.

According to an alternative embodiment, in Formula 5, $X_1$ may be derived from 4,4'-(hexafluoroisopropylidene) diphthalic anhydride and $X_2$ and $X_3$ may be each independently derived from at least one compound selected from the group consisting of pyromellitic dianhydride and 3,3',4,4'-biphenyltetracarboxylic dianhydride.

In this embodiment, at least one of $Y_1$ to $Y_3$ is preferably a divalent organic group derived from 2,2'-bis(trifluoromethyl)benzidine.

In Formula 5, p, q, and r may satisfy the relations of $0 \leq p \leq 0.5$ and $0.5 \leq q+r \leq 1$.

p/(p+q+r) and r/(p+q+r) may be each independently not greater than about 0.4 or from about 0.1 to about 0.3 and q/(p+q+r) may be from about 0.5 to about 0.8.

It is preferred to react the acid dianhydride with the diamine-based compound in an appropriate ratio taking into consideration the desired physical properties of the polyimide. Specifically, the diamine compound is reacted with the acid dianhydride in a molar ratio ranging from 1:0.8 to 1:1.2 or from 1:0.9 to 1:1.1. Outside this range, the imidization degree or molecular weight of the polyimide is lowered, making it difficult to form a film.

The polymerization reaction of the acid dianhydride and the diamine-based compound may be carried out by any suitable polymerization process such as solution polymerization, for the preparation of polyimides or precursors thereof.

Specifically, according to solution polymerization, the diamine-based compound is dissolved in a polymerization solvent and the acid dianhydride is added to the solution to react with the diamine-based compound. The polymerization solvent is preferably a solvent that has a positive partition coefficient (Log P) at 25° C., as calculated using an ACD/Log P module of an ACD/Percepta platform available from ACD/Labs (for reference, the ACD/Log P module uses an algorithm based on quantitative structure-property relationship methodology using 2D molecular structures).

The polymerization reaction is preferably carried out by pre-polymerization at a temperature of about 10 to about 30° C., a temperature of about 15 to about 25° C. or room temperature for about 0.5 to about 5 hours or about 1 to about 3 hours and post-polymerization at a temperature of about 30 to 65° C. or a temperature of about 40 to about 60° C. for about 5 to 50 hours, about 10 to 40 hours or about 20 to about 30 hours.

As a result of the polymerization reaction, a polyamic acid as a precursor of the polyimide is prepared.

The polyamic acid is an acid or a derivative of the acid including —CO—NH— and —CO—OR groups (where R is a hydrogen atom or an alkyl group), which are formed as a result of the reaction between the acid anhydride groups and the amino groups. According to a further embodiment, the polyamic acid has a structure of Formula 2:

(2)

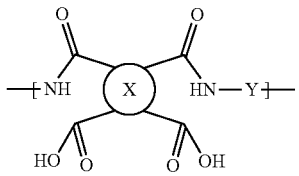

wherein X and Y are as defined above.

After the polymerization reaction, the resulting polyamic acid is imidized. Specifically, the imidization may be performed by chemical imidization or thermal imidization.

Specifically, the chemical imidization may be performed using a dehydrating agent. The dehydrating agent may be, for example, an acid anhydride, such as acetic anhydride, propionic anhydride or benzoic anhydride, or its acid chloride, or a carbodiimide compound, such as dicyclohexylcarbodiimide. The dehydrating agent is preferably used in an amount of 0.1 to 10 moles per mole of the acid dianhydride.

The chemical imidization may also be effected in combination with heating at a temperature of 60 to 120° C.

The thermal imidization may be performed by heat treatment at a temperature of 80 to 400° C. As a result of dehydration, water is formed, which is more preferably removed by azeotropic distillation with benzene, toluene or xylene.

The chemical or thermal imidization process may be carried out in the presence of a base catalyst, such as pyridine, isoquinoline, trimethylamine, triethylamine, N,N-dimethylaminopyridine, imidazole, 1-methylpiperidine or 1-methylpiperazine. The base catalyst may be used in an amount of 0.1 to 5 moles per mole of the acid dianhydride.

During the imidization process, water is formed from H of the —CO—NH— group and OH of the —CO—OH group and departs from the polyamic acid molecule, giving the polyimide of Formula 1 having a cyclic chemical structure (—CO—N—CO—).

The polyimide of Formula 1 is obtained in the form of a solution in the organic solvent used for the polymerization reaction. The solution may contain the unimidized polyimide precursor, i.e. the polyamic acid.

Thus, the polyimide or its precursor is separated as a solid and re-dissolved in an organic solvent to prepare the polyimide-based solution of the present invention. Alternatively, the as-prepared solution may also be used. The polyimide may be isolated by adding a poor solvent for the polyimide to the resulting solution to precipitate the polyimide, which is subjected to a series of processes, such as filtration, washing, and drying. The poor solvent may be, for example, methanol or isopropyl ether. The re-dissolution may be performed using the same organic solvent as that used in the polymerization reaction. That is, the re-dissolution solvent may be a solvent that has a positive partition coefficient (Log P) at 25° C., as calculated using an ACD/Log P module of an ACD/Percepta platform available from ACD/Labs. The ACD/Log P module uses an algorithm based on quantitative structure-property relationship methodology using 2D molecular structures.

The polyimide-based solution thus prepared enables the production of an isotropic or anisotropic polyimide-based film with high transmittance, ultra-high heat resistance, and excellent mechanical properties.

That is, the present invention also provides a method for producing a polyimide-based film, including applying the polyimide-based solution to one side of a substrate, curing the polyimide-based solution to form a polyimide-based film, and separating the polyimide-based film from the substrate.

Specifically, the polyimide resin may have an imidization degree of about 60% to about 99%, about 70% to about 98% or about 75 to about 96% when the imidization degree is defined as the percentage of the integrated intensity of the CN bands observed at 1350 to 1400 $cm^{-1}$ or 1550 to 1650 $cm^{-1}$ in the IR spectrum after a composition including the polyamic acid as the polyimide precursor is applied and imidized at a temperature of 200° C. or above with respect to the integrated intensity (100%) of the CN bands observed in the same wavelength range after the composition is imidized at a temperature of 500° C. or above.

The polyimide of Formula 1 may have a weight average molecular weight of 10,000 to 200,000 g/mol, 20,000 to 100,000 g/mol or 40,000 to 200,000 g/mol, as measured on a polystyrene basis.

Preferably, the polyimide of Formula 1 has a molecular weight distribution (Mw/Mn) of 1.1 to 2.5.

If the imidization degree, weight average molecular weight or molecular weight distribution of the polyimide of Formula 1 are outside the corresponding ranges defined above, there is a difficulty in forming the film or there is a risk that the characteristics (such as transmittance, heat resistance, and mechanical properties) of the polyimide-based film may deteriorate.

The polyimide of Formula 1 may have a glass transition temperature of at least about 250° C. or 250 to 320° C. Due to good heat resistance of the polyimide, the film including the polyimide is highly resistant to high temperature during processing for the fabrication of a device and can be prevented from warpage in the course of fabricating a device on the polyimide-based film as a display substrate. In addition, the polyimide-based film can prevent the reliability of a device from deteriorating. As a result, the use of the polyimide-based film enables the fabrication of a device with improved characteristics and high reliability.

The solid component of the polyimide-based solution according to the present invention is preferably present in such an amount that the composition for film formation has an appropriate viscosity considering its film formation processability, such as coatability. Specifically, the content of the solid component in the polyimide-based solution is preferably determined such that the composition for film formation has a viscosity of 400 to 50,000 cP. The viscosity of the composition for the formation of the polyimide-based film may be less than 400 cP or exceed 50,000 cP when the content of the organic solvent is excessively low or high. In this case, there is a risk that processability may be deteriorated when the composition for the formation of the polyimide-based film is used to produce a display substrate. Most preferably, the composition has a solid content of 10% to 25% by weight and a viscosity of 1,000 to 50,000 cP or 2,000 to 10,000 cP.

The polyimide-based solution may include the polyimide precursor. In this case, the polyimide-based solution contains the polyamic acid that is prepared by polymerization of the acid dianhydride and the diamine-based compound in the polymerization solvent.

The polyimide-based solution including the polyimide or its precursor may further include additives that are commonly used in the formation of polyimide-based films. Examples of such additives include binders, solvents, cross-linking agents, initiators, dispersants, plasticizers, viscosity modifiers, UV absorbents, photosensitive monomers, and sensitizers.

Next, the polyimide-based solution is applied to one side of a substrate, cured at a temperature of 80 to 400° C., and separated from the substrate to produce the polyimide-based film.

The substrate may be, for example, a glass, metal or plastic substrate but is not particularly limited thereto. Particularly preferred is a glass substrate that is highly stable against heat and chemicals during curing and can be easily separated without damage to the polyimide-based film formed after curing, avoiding the need for further treatment with a release agent.

The application may be performed by any suitable technique known in the art. Specifically, spin coating, bar coating, roll coating, air-knife coating, gravure coating, reverse roll coating, kiss roll coating, doctor blade coating, spraying, dipping or brushing may be used to apply the polyimide-based solution. Casting is more preferred that can be performed in a continuous process and can increase the imidization degree of the polyimide-based resin.

The polyimide-based solution can be applied onto the substrate to a thickness such that the final polyimide-based film has a suitable thickness for its use as a display substrate. Specifically, the polyimide-based solution can be applied in such an amount that the polyimide-based film has a thickness of 10 to 30 µm.

After application of the polyimide-based solution, drying may be optionally further performed prior to curing to remove the solvent present in the polyimide-based solution.

The drying may be performed by any suitable process known in the art. Specifically, the drying can be performed at a temperature not higher than 140° C. or at a temperature of 80 to 140° C. If the drying temperature is lower than 80° C., a long time is required for drying. Meanwhile, if the drying temperature exceeds 140° C., imidization proceeds rapidly, which makes it difficult to obtain a uniform thickness of the polyimide-based film.

Subsequently, the polyimide-based solution may be cured by heat treatment at a temperature of 80 to 400° C. It is also possible to cure the polyimide-based solution by stepwise heat treatment at various temperatures within the temperature range defined above. The curing time is not especially limited and may be, for example, from 30 minutes to 6 hours.

After curing, subsequent heat treatment may be optionally further performed to increase the imidization degree of the polyimide-based resin in the polyimide-based film, achieving the desired physical properties of the polyimide-based film.

The subsequent heat treatment is preferably performed at a temperature of at least 200° C. or a temperature of 200 to 450° C. for 1 to 30 minutes. The subsequent heat treatment may be performed either only once or at least twice in a stepwise manner. Specifically, the heat treatment may performed by three heat treatment steps including primary heat treatment at 200 to 220° C., secondary heat treatment at 300 to 350° C., and tertiary heat treatment at 400 to 450° C.

Thereafter, the polyimide-based film is peeled from the substrate by any suitable technique known in the art.

Due to the presence of the polyimide of Formula 1, the polyimide-based film exhibits high transparency, heat resistance, and mechanical strength, thus being suitable for use as a substrate of a device, such as an OLED, an LCD, an electronic paper or a solar cell where high transparency, heat resistance, and mechanical strength are needed.

More specifically, the film may undergo a dimensional change of less than 200 µm, not greater than 170 µm or not greater than 150 µm at 400° C. A lower dimensional change is more desirable. According to one embodiment, the dimensional change of the film may be 50 µm or more or 80 µm or more.

More specifically, the polyimide-based film may have a coefficient of thermal expansion (CTE) not higher than about 70 ppm/K, not higher than about 65 ppm/K or from about 1 to about 63 ppm/K when heated from 100° C. to 300° C., indicating its high heat resistance.

The polyimide-based film has a haziness of 2 or less, a transmittance of at least 85% or at least 87% to light at a wavelength of 380 to 760 nm in the film thickness of 10 to 30 μm, and a yellowness index (YI) not higher than about 9, not higher than about 8 or not higher than about 6, indicating its high transparency. The polyimide-based film can exhibit markedly improved transparency and optical properties due to its high transmittance and low yellowness index.

The polyimide-based film has a modulus of at least about 1.0 GPa or about 1.5 to about 2.5 GPa, a maximum stress value of about 40 to about 400 MPa or about 85 to about 300 MPa, and a maximum elongation of about 10 to about 100% or about 10 to about 45%, indicating its excellent mechanical properties.

According to one embodiment, the polyimide-based film may be an isotropic film that has an in-plane retardation ($R_{in}$) of about 0.01 to about 1 nm or about 0.05 to about 0.5 nm and a thickness retardation ($R_{th}$) not larger than about 100 nm or not larger than about 90 nm.

According to an alternative embodiment, the polyimide-based film may be an anisotropic film that has an in-plane retardation ($R_{in}$) of about 0.05 to about 1 nm or about 0.1 to about 0.5 nm and a thickness retardation ($R_{th}$) of at least about 100 nm or at least about 150 nm.

Thus, further embodiments of the present invention provide a display substrate and a device including the polyimide-based film.

Specifically, the device may be any solar cell (e.g., a flexible solar cell) having a flexible substrate, an organic light emitting diode (OLED) lighting device (e.g., a flexible OLED lighting device), any semiconductor device having a flexible substrate, or a flexible display device having a flexible substrate, such as an organic electroluminescence device, an electrophoretic device or an LCD device.

Hereinafter, embodiments of the present invention will be explained in detail such that the invention can be easily carried out by a person having ordinary knowledge in the art. The invention may, however, be embodied in many different forms and should not be construed as being limited to the embodiments set forth herein.

Partition Coefficients

The partition coefficients (Log P values, 25° C.) of solvents used in the following examples were calculated using an ACD/Log P module of an ACD/Percepta platform available from ACD/Labs. The ACD/Log P module uses an algorithm based on quantitative structure-property relationship methodology using 2D molecular structures.

| Solvent | | | | | | |
|---|---|---|---|---|---|---|
| DEF | DMF | DEAc | DMAc | NMP | NEP | Equamide-M100 |
| LogP (25° C.) 0.05 | −1.01 | 0.32 | −0.75 | −0.28 | 0.22 | −0.74 |

The abbreviations in the above table are as follows.
DMAc: N,N-dimethylacetamide
DEAc: N,N-diethylacetamide
DEF: N,N-diethylformamide
DMF: N,N-dimethylformamide
NMP: N-methylpyrrolidone
NEP: N-ethylpyrrolidone
Equamide-M100 (available from Idemitsu Kosan Co., Ltd.)

The abbreviations used in the following examples are as follows.
6FDA: 4,4'-(hexafluoroisopropylidene)diphthalic anhydride
PMDA: pyromellitic dianhydride
PMDA-H: 1,2,4,5-cyclohexanetetracarboxylic dianhydride
BPDA: 3,3',4,4'-biphenyltetracarboxylic dianhydride
aBPDA: 2,3,3',4'-biphenyltetracarboxylic dianhydride
ODPA: 4,4'-oxydiphthalic anhydride
aODPA: 2,3,3',4'-oxydiphthalic anhydride
TFMB: 2,2'-bis(trifluoromethyl)benzidine
PDA: para-phenylenediamine
m-PDA: meta-phenylenediamine
ODA: 4,4'-oxydianiline
FDA: 4,4'-(9-fluorenylidene)dianiline
HFBAPP: 2,2-bis[4-(-aminophenoxy)phenyl]hexafluoropropane Example 1

Example 1-1

18 g of ODPA was dissolved in 45 g of DEF under a nitrogen atmosphere for 20 min. To the resulting OPDA/DEF solution was added a solution of 18.5 g of TFMB as a diamine-based compound in 45 g of DEF. The mixture was allowed to react at 25° C. for 2 h. After the temperature was raised to 40° C., the reaction was continued for 24 h. The solid content of the reaction solution was adjusted to 18 wt % by the addition of DEF such that the reaction solution had a viscosity of 5,000 cP. The solution was homogenized for 24 h to prepare a polyamic acid solution (i.e. a polyimide precursor solution).

Polyimide precursor solutions were prepared by the same procedure as described above, except that the compounds described in Table 1 were used as acid dianhydrides and diamine-based compounds for the preparation of polyamic acids.

Comparative Examples 1-1 to 1-4

Polyamic acid solutions were prepared in the same manner as in Example 1-1, except that the acid dianhydride and the diamine-based compound for the preparation of the polyamic acid and the solvent were changed as shown in Table 1.

Experimental Example 1-1

Each of the polyimide precursor solutions was spin coated to a thickness of 20 microns on a glass substrate. After standing at 30° C. and a humidity of 70% for 30 min, the haze of the coating was measured using a hazemeter (NIPPON DENSHOKU, NDH5000SP) in accordance with the ASTM D1003 test method. The results are shown in Table 1.

TABLE 1

| | | Haze (%) | | | |
|---|---|---|---|---|---|
| Test No. | Anhydride/diamine | Example 1-1 DEF | Comparative Example1-1 DMAc | Comparative Example1-2 DMF | Comparative Example 1-3 NMP | Comparative Example 1-4 EQ-M100 |
| 1 | ODPA/TFMB | 0.6 | 75 | 74 | 85 | 47 |
| 2 | ODPA/HFBAPP | 0.4 | 50 | 60 | 70 | 30 |
| 3 | BPDA/TFMB | 0.5 | 52 | 63 | 84 | 35 |
| 4 | aBPDA/TFMB | 0.4 | 67 | 61 | 78 | 41 |
| 5 | aODPA/TFMB | 0.6 | 86 | 87 | 87 | 46 |
| 6 | PMDA/TFMB | 0.4 | 50 | 60 | 70 | 30 |
| 7 | PMDA-H/HFBAPP | 0.5 | 63 | 78 | 79 | 35 |
| 8 | 6FDA/TFMB | 0.5 | 72 | 76 | 87 | 43 |
| 9 | 6FDA/PDA | 0.4 | 50 | 60 | 70 | 30 |
| 10 | 6FDA/m-PDA | 0.6 | 52 | 63 | 84 | 35 |

FIG. 1 shows images of the polyamic acid solutions of Test No. 8 (6FDA/TFMB) 30 min after coating on the substrates.

As can be seen from the results in Table 1 and FIG. 1, the polyamic acid solutions prepared using the solvent in Example 1-1 were significantly prevented from clouding even 30 min after coating.

Experimental Example 1-2

The glass substrate coated with the polyimide precursor solution in Experimental Example 1-1 was placed in an oven, heated at a rate of 2° C./min, and cured while maintaining at 80° C. for 15 min, at 150° C. for 30 min, at 220° C. for 30 min, and at 350° C. for 1 h. After completion of the curing, the glass substrate was immersed in water and the film was peeled from the glass substrate. The film was dried at 100° C. in an oven.

The physical properties, including transmittance, yellowness index, retardation value, glass transition temperature, and coefficient of thermal expansion, of each polyimide-based film were measured by the following procedures.

The transmittance of the film was measured using a transmittance meter (HR-100, Murakami Color Research Laboratory) in accordance with JIS K 7105.

The yellowness Index (YI) was measured using a colorimeter (Color Eye 7000A).

The in-plane retardation (Rin) and the thickness retardation (Rth) of the film were measured using Axoscan. First, the film was cut to a predetermined size and thickness of the sample was measured. The retardation of the sample was measured using Axoscan and the measured thickness was input while calibrating in the C-plate direction to compensate for the retardation value. The refractive index of the sample was measured by inputting the refractive index of the polyimide.

The glass transition temperature (Tg) and coefficient of thermal expansion (CTE) of the film were measured using a thermomechanical analyzer Q400, TA). The film was cut to a size of 5×20 mm and the sample was loaded using an accessory. The length of the film for measurement was set to 16 mm. The force to pull the film was set to 0.02 N and the film was heated at a rate of 5/min from 30° C. to 350° C. The coefficients of linear thermal expansion of the film were measured in the range of 300-350° C. and averaged.

The mechanical properties (modulus, maximum stress, and maximum elongation) of the film were measured using a Zwick universal testing machine (UTM). After the film was cut to a size of ≥5 mm (w)×≥60 mm (I), the distance between the grips was set to 40 mm and the values were measured while pulling the sample at a rate of 20 mm/min.

TABLE 2

| | Test film No. | | | | |
|---|---|---|---|---|---|
| | Example 1-1 | Comparative Example 1-1 | Comparative Example 1-2 | Comparative Example 1-3 | Comparative Example 1-4 |
| Thickness (mm) | 10.9 | 10.6 | 10.8 | 10.7 | 10.6 |
| Transmittance (%) $T_{555}$ | 89.9 | 89.6 | 89.4 | 88.4 | 88.3 |
| Tg (° C.) | 300 | 300 | 300 | 300 | 300 |
| CTE (ppm/K, ~250° C.) | 50 | 53 | 51 | 50 | 54 |

The results in Table 2 demonstrate that the polyimide-based film produced using the polyamic acid solution in Example 1-1 is a highly transparent isotropic film with high heat resistance and excellent mechanical properties.

Although there were no significant differences in physical properties between the films of Example 1-1 and Comparative Examples 1-1 to 1-4, the coatings of the comparative polyamic acid solutions had high hazes, as shown in Table 1, which is explained by the formation of salts as a result of the reaction of the polyamic acids with water to cause aggregation. This aggregation is responsible for the rough surfaces of the films produced using the comparative solutions.

Example 2

Examples 2-1 to 2-3 and Comparative Examples 2-1 to 2-3

15 g of 6FDA was dissolved in 30 g DEF under a nitrogen atmosphere for 20 min. To the resulting 6FDA/DEF solution was added a solution of 5.4 g of TFMB and 1.82 g of m-PDA as diamine-based compounds in 30 g of DEF. The mixture was allowed to react at 25° C. for 2 h. After the temperature was raised to 40° C., the reaction was continued for 24 h. The solid content of the reaction solution was adjusted to 18 wt % by the addition of DEF such that the reaction solution had a viscosity of 5,000 cP. The solution was homogenized for 24 h to prepare a polyamic acid solution.

Polyimide precursor solutions were prepared in the same manner, except that the diamine-based compounds and their amounts and the solvent were changed as described in Tables 3-5 to prepare polyamic acids.

Experimental Example 2-1

Each of the polyimide precursor solutions was spin coated to a thickness of 20 microns on a glass substrate. After standing at 30° C. and a humidity of 70% for 30 min, the haze of the coating was measured using a hazemeter (NIPPON DENSHOKU, NDH5000SP) in accordance with the ASTM D1003 test method. The results are shown in Table 3.

TABLE 3

| Example No. | Haze (%) | Comparative Example No. | Haze (%) |
|---|---|---|---|
| 2-1 | 0.1 | 2-1 | 78 |
| 2-2 | 0.2 | 2-2 | 80 |
| 2-3 | 0.1 | 2-3 | 75 |

The inventive polyamic acid solutions were significantly prevented from clouding.

Experimental Example 2-2

Films were produced in the same manner as in Experimental Example 1-2, except that the glass substrate coated with the polyimide precursor solution prepared in Experimental Example 2-1 was used. The physical properties, including transmittance, yellowness index, retardation value, glass transition temperature, and coefficient of thermal expansion, of each polyimide-based film were measured by the same procedures as described in Experimental Example 1-2. The results are shown in Tables 4-6.

TABLE 4

| | Test film No. | |
|---|---|---|
| | Example 2-1 | Comparative Example 2-1 |
| Acid dianhydride | 6FDA | 6FDA |
| Diamines | TFMB/m-PDA | TFMB/m-PDA |
| Molar ratio of diamines | 5/5 | 5/5 |
| Solvent | DEF | Equamide-100 |
| LogP (25° C.) | 0.05 | −0.74 |
| Thickness (mm) | 12.3 | 10.8 |
| Transmittance (%) $T_{555}$ | 90 | 89.8 |
| $T_{ave. (380-760\ nm)}$ | 89.2 | 88.1 |
| YI | 5.4 | 8.4 |
| $R_{in}$ (nm) | 0.2 | 0.05 |
| $R_{th}$ (nm) | 44 | 38 |
| Tg (° C.) | 330 | 330 |
| CTE (ppm/K, ~250° C.) | 40 | 50 |
| CTE (ppm/K, ~300° C.) | 52 | 56 |
| Modulus (GPa) | 2.8 | 3.2 |
| Maximum stress (Mpa) | 120 | 123 |
| Maximum elongation (%) | 20 | 16 |

TABLE 5

| | Test film No. | |
|---|---|---|
| | Example 2-2 | Comparative Example 2-2 |
| Acid dianhydride | 6FDA | 6FDA |
| Diamines | TFMB/ODA/FDA | TFMB/ODA/FDA |
| Molar ratio of diamines | 7/2/1 | 7/2/1 |
| Solvents | DEF | Equamide-100 |
| LogP (25° C.) | 0.05 | −0.74 |
| Thickness (mm) | 11.9 | 12.7 |
| Transmittance (%) $T_{555}$ | 89.7 | 88.9 |
| $T_{ave. (380-760\ nm)}$ | 86.8 | 85.7 |
| YI | 5.2 | 6.3 |
| $R_{in}$ (nm) | 0.05 | 0.15 |
| $R_{th}$ (nm) | 65 | 74 |
| Tg (° C.) | 325 | 325 |
| CTE (ppm/K, ~250° C.) | 43 | 52 |
| CTE (ppm/K, ~300° C.) | 57 | 64 |
| Modulus (GPa) | 3.7 | 3.8 |
| Maximum stress (Mpa) | 112 | 118 |
| Maximum elongation (%) | 13.5 | 9.4 |

TABLE 6

| | Test film No. | |
|---|---|---|
| | Example 2-3 | Comparative Example 2-3 |
| Acid dianhydride | 6FDA | 6FDA |
| Diamines | TFMB/PDA/FDA | TFMB/PDA/FDA |
| Molar ratio of diamines | 7/2/1 | 7/2/1 |
| Solvents | DEF | Equamide-100 |
| LogP (25° C.) | 0.05 | −0.74 |
| Thickness (mm) | 11.6 | 11.7 |
| Transmittance (%) $T_{555}$ | 90 | 89.4 |
| $T_{ave. (380-760\ nm)}$ | 87.5 | 86.6 |
| YI | 5.2 | 6.5 |
| $R_{in}$ (nm) | 0.13 | 0.05 |
| $R_{th}$ (nm) | 62 | 54 |
| Tg (° C.) | 325 | 325 |
| CTE (ppm/K, ~250° C.) | 45 | 55 |
| CTE (ppm/K, ~300° C.) | 57 | 65 |
| Modulus (GPa) | 2.9 | 3.2 |
| Maximum stress (Mpa) | 105 | 112 |
| Maximum elongation (%) | 11.3 | 27 |

The results in Tables 4-6 demonstrate that the polyimide-based films of Examples 2-1 to 2-3 are highly transparent isotropic films with high heat resistance and excellent mechanical properties. Particularly, it can be confirmed that the transparencies and yellowness indices of the films were affected by the kind of the solvent. In comparison with the solvent with high polarity and high boiling point, the hydrophobic solvent with low polarity and low boiling point had appropriate compatibility with the polyamic acid structures and was rapidly vaporized as the curing temperature increased. Therefore, the hydrophobic solvent was present in small amounts in the polymer solutions, and as a result, low contents of impurities were obtained, leading to low yellowness indices of the films.

Example 3

Examples 3-1 and 3-2 and Comparative Example 3-1

4.52 g of 6FDA, 6.67 g of PMDA, and 3 g of BPDA were dissolved in 45.42 g of NEP under a nitrogen atmosphere over 20 min. To the resulting 6FDA/PMDA/BPDA/NEP solution was added a solution of 16.32 g of TFMB as a diamine-based compound in 50 g of NEP. The mixture was allowed to react at 25° C. for 2 h. After the temperature was raised to 40° C., the reaction was continued for 24 h. The solid content of the reaction solution was adjusted to 18 wt % by the addition of NEP such that the reaction solution had a viscosity of 5,000 cP. The solution was homogenized for 24 h to prepare a polyamic acid solution.

Polyimide precursor solutions (Example 3-2 and Comparative Example 3-1) were prepared in the same manner, except that the solvent was changed as shown in Tables 8.

Experimental Example 3-1

Each of the polyimide precursor solutions was spin coated to a thickness of 20 microns on a glass substrate. After standing at 30° C. and a humidity of 70% for 30 min, the haze of the coating was measured using a hazemeter (NIPPON DENSHOKU, NDH5000SP) in accordance with the ASTM D1003 test method to observe whether the coating was prevented from clouding and curling. The results are shown in FIGS. 2 and 3.

Figure 2:
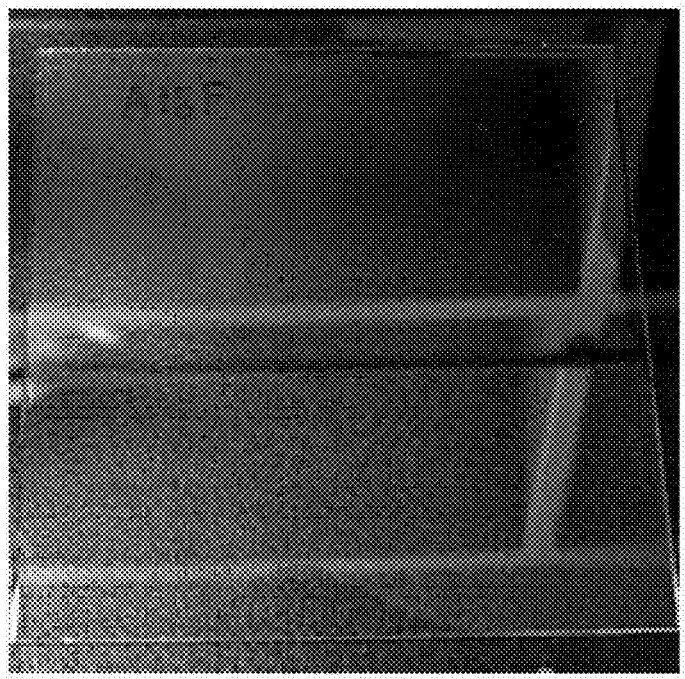
FIG. 2 is an image showing whether a polyimide-based solution prepared in Example 3-1 was prevented from clouding.
Figure 3:
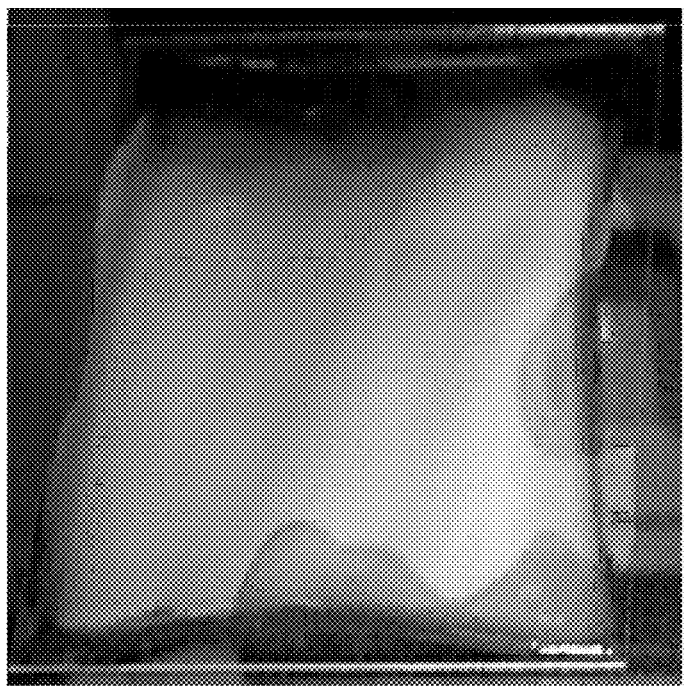
FIG. 3 is an image showing whether a polyimide-based solution prepared in Comparative Example 3-1 was prevented from clouding.

FIGS. 2 and 3 show that the polyimide-based solution of Example 3-1 (FIG. 2) was significantly prevented from clouding and curling compared to the solution prepared using NMP in Comparative Example 3-1 (FIG. 3).

TABLE 7

|  | Haze (%) |
| --- | --- |
| Example 3-1 | 0.1 |
| Example 3-2 | 0.1 |
| Comparative Example 3-1 | 65 |

Test Example 3-2

Films were produced in the same manner as in Experimental Example 1-2, except that the glass substrate coated with the polyimide precursor solution prepared in Experimental Example 3-1 was used. The physical properties, including transmittance, yellowness index, retardation value, glass transition temperature, and coefficient of thermal expansion, of each polyimide-based film were measured by the same procedures as described in Experimental Example 1-2. The results are shown in Table 8.

TABLE 8

|  | Test film No. | | |
| --- | --- | --- | --- |
|  | Example 3-1 | Example 3-2 | Comparative Example 3-1 |
| Acid dianhydride | PMDA/6FDA/BPDA (6/2/2) | | |
| Diamine | TFMB | | |
| Solvent | NEP | DEF | NMP |
| LogP (25° C.) | 0.22 | 0.05 | −0.28 |
| Viscosity (cp) | 46400 | 14800 | 78000 |
| Thickness (μm) | 11.4 | 11 | 11.3 |
| Transmittance T$_{ave.\ (380-760\ nm)}$ (%) | 82 | 82 | 82 |
| YI | 7.2 | 7.8 | 7.3 |
| R$_{th}$ (nm) | 803 | 825 | 811 |
| CTE 100-300° C. (ppm/° C.) | 9.7 | 12 | 11 |
| 300-100° C. (ppm/° C.) | 22 | 20 | 19 |
| Modulus (GPa) | 4.9 | 5.9 | 5.5 |
| Maximum stress (MPa) | 140 | 180 | 231 |
| Maximum elongation (%) | 13 | 19 | 29 |

The results of Table 8 demonstrate that the polyimide-based films of Examples 3-1 and 3-2 are highly transparent anisotropic films with high heat resistance and excellent mechanical properties.

While specific embodiments of the invention have been described in detail, it will be appreciated by those skilled in the art that such detailed descriptions are merely preferred embodiments and the scope of the present invention is not limited thereto. Therefore, the true scope of the present invention should be defined by the appended claims and their equivalents.

What is claimed is:
1. A display substrate comprising a polyimide-based film obtained from a solvent having a positive partition coefficient (Log P) at 25° C. and a polyamic acid having a structure of Formula 2:

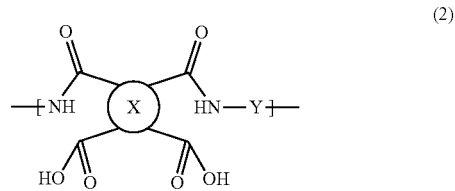

(2)

wherein X is a tetravalent organic group derived from an acid dianhydride and Y is divalent organic group derived from a diamine;
wherein a coating of the polyimide-based solution on a substrate has a haze of 1% or less after storage at a temperature of 30° C. and a humidity of 70% for 30 minutes; and
wherein the diamine is at least one selected from the group consisting of 4,4'-diaminodiphenyl ether, 4,4'-diaminodiphenylsulfide, 4,4'-diaminodiphenylsulfone, 4,4'-diaminobenzophenone, bis[4-(4-aminophenoxy)phenyl]methane, 2,2-bis[4-(4-aminophenoxy)phenyl]propane, 2,2-bis[4-(4-aminophenoxy)phenyl]-1,1,1,3,3,3-hexafluoropropane, 1,3-bis(4-aminophenoxy)benzene, 4,4'-bis(4-aminophenoxy)biphenyl, bis[4-(4-aminophenoxy)phenyl]ketone, bis[4-(4-aminophenoxy)phenyl]sulfoxide, bis[4-(4-aminophenoxy)phenyl]sulfone, bis[4-(4-aminophenoxy)phenyl]ether, 4,4'-bis(4-aminophenylsulfonyl)diphenyl ether, 4,4'-bis(4-aminothiophenoxy)diphenylsulfone, 1,4-bis[4-(4-aminophenoxy)benzoyl]benzene, 3,3'-diaminodiphenyl ether, 3,3-diaminodiphenylsulfide, 3,3'-diaminodiphenylsulfone, 3,3'-diaminobenzophenone, bis[4-(3-aminophenoxy)-phenyl]methane, 2,2-bis[4-(3-aminophenoxy)phenyl]propane, 2,2-bis[4-(3-aminophenoxy)phenyl-1,1,1,3,3,3-hexafluoropropane, 1,3-bis(3-aminophenoxy)benzene, 4,4'-bis(3-aminophenoxy)biphenyl, bis[4-(3-aminophenoxy)phenyl]ketone, bis[4-(3-aminophenoxy)phenyl]sulfide, bis[4-(3-aminophenoxy)phenyl]sulfone, bis[4-(3-aminophenoxy)phenyl]ether, 4,4'-bis(3-aminophenylsulfonyl)diphenyl ether, 4,4'-bis(3-aminothiophenoxy)diphenylsulfone, 1,4-bis[4-(3-aminophenoxy)benzoyl]benzene, 2,2'-bis(trifluoromethyl)benzidine, 2,2-bis[4-(-aminophenoxy)phenyl]hexafluoropropane, para-phenylene diamine, meta-phenylene diamine, and 4,4'-(9-fluorenylene)dianiline, wherein Y in the polyamic acid comprises both a divalent organic group having a fluorine atom-containing substituent and a divalent organic group having no fluorine atom-containing substituent, and wherein the molar ratio of the divalent organic group having a fluorine atom-containing substituent to all divalent organic groups in Y is from 0.1:1 to 0.9:1.

2. The display substrate comprising a polyimide-based film according to claim 1, wherein X comprises a tetravalent organic group having a fluorine atom-containing substituent.

3. The display substrate comprising a polyimide-based film according to claim 1, wherein the divalent organic groups are each independently selected from divalent aromatic organic groups, divalent alicyclic organic groups, divalent aliphatic organic groups, and combinations thereof and the tetravalent organic groups are each independently selected from tetravalent aromatic organic groups, tetravalent alicyclic organic groups, tetravalent aliphatic organic groups, and combinations thereof.

4. The display substrate comprising a polyimide-based film according to claim 1, wherein Y comprises a divalent monocyclic or polycyclic aromatic organic group, a divalent monocyclic or polycyclic alicyclic organic group, or a divalent organic group having a structure in which two or more divalent organic groups selected from divalent monocyclic or polycyclic aromatic organic groups and divalent monocyclic or polycyclic alicyclic organic groups are linked to each other via a single bond or a linking group.

5. The display substrate comprising a polyimide-based film according to claim 1, wherein the divalent organic group having a fluorine atom-containing substituent is a divalent monocyclic or polycyclic aromatic organic group, a divalent monocyclic or polycyclic alicyclic organic group, or a divalent organic group having a structure in which two or more divalent organic groups selected from divalent monocyclic or polycyclic aromatic organic groups and divalent monocyclic or polycyclic alicyclic organic groups are linked to each other via a single bond or a linking group, and the fluorine atom-containing substituent is directly substituted on the aromatic or alicyclic ring or is substituted on the linking group.

6. The display substrate comprising a polyimide-based film according to claim 1, wherein the divalent organic group having a fluorine atom-containing substituent is derived from 2,2'-bis(trifluoromethyl)benzidine or 2,2-bis[4-(-aminophenoxy)phenyl]hexafluoropropane.

7. The display substrate comprising a polyimide-based film according to claim 1, wherein the divalent organic group having no fluorine atom-containing substituent is derived from at least one compound selected from 4,4'-oxydianiline, 4,4'-(9-fluorenylidene)dianiline, para-phenylenediamine, and meta-phenylenediamine.

8. The display substrate comprising a polyimide-based film according to claim 1, wherein X in the polyamic acid comprises a tetravalent organic group having a fluorine atom-containing substituent and a tetravalent organic group having no fluorine atom-containing substituent.

9. The display substrate comprising a polyimide-based film according to claim 2, wherein the molar ratio of the tetravalent organic group having a fluorine atom-containing substituent to all tetravalent organic groups in X is from 0.1:1 to 1:1.

10. The display substrate comprising a polyimide-based film according to claim 1, wherein X comprises a tetravalent monocyclic or polycyclic aromatic organic group, a tetravalent monocyclic or polycyclic alicyclic organic group, or a tetravalent organic group having a structure in which two or more tetravalent organic groups selected from tetravalent monocyclic or polycyclic aromatic organic groups and tetravalent monocyclic or polycyclic alicyclic organic groups are linked to each other via a single bond or a linking group.

11. The display substrate comprising a polyimide-based film according to claim 2, wherein the tetravalent organic group having a fluorine atom-containing substituent is a tetravalent monocyclic or polycyclic aromatic organic group, a tetravalent monocyclic or polycyclic alicyclic organic group, or a tetravalent organic group having a structure in which two or more tetravalent organic groups selected from tetravalent monocyclic or polycyclic aromatic organic groups and tetravalent monocyclic or polycyclic alicyclic organic groups are linked to each other via a single bond or a linking group, and the fluorine atom-containing substituent is directly substituted on the aromatic or alicyclic ring or is substituted on the linking group.

12. The display substrate comprising a polyimide-based film according to claim 2, wherein the tetravalent organic group having a fluorine atom-containing substituent is derived from 4,4'-(hexafluoroisopropylidene)diphthalic anhydride.

13. The display substrate comprising a polyimide-based film according to claim 8, wherein the tetravalent organic group having no fluorine atom-containing substituent is derived from at least one compound selected from 3,3',4,4'-biphenyltetracarboxylic dianhydride, 2,3,3',4'-biphenyltetracarboxylic dianhydride, pyromellitic anhydride, 1,2,4,5-cyclohexanetetracarboxylic dianhydride, 4,4'-oxydiphthalic anhydride, and 2,3,3',4'-oxydiphthalic anhydride.

14. The display substrate comprising a polyimide-based film according to claim 1, wherein the polyimide-based solution has a viscosity of 400 cP to 50,000 cP, as measured using a Brookfield rotational viscometer at 25° C.

15. The display substrate comprising a polyimide-based film according to claim 1, wherein the polyimide-based film has a glass transition temperature of at least 250° C. and a transmittance of at least 85% to light at a wavelength of 380 to 760 nm in the thickness range of 10 to 30 μm.

16. The display substrate comprising a polyimide-based film according to claim 1, wherein the polyimide-based film has a coefficient of thermal expansion (CTE) of 70 ppm/K or less at 250° C.

17. The display substrate comprising a polyimide-based film according to claim 1, wherein the polyimide-based film has an in-plane retardation ($R_{in}$) of 0.01 to 1 nm and a thickness retardation ($R_{th}$) of 100 nm or less.

18. The display substrate comprising a polyimide-based film according to claim 1, wherein the polyimide-based film has a thickness retardation ($R_{th}$) of at least 100 nm.

19. The display substrate comprising a polyimide-based film according to claim 1, wherein the polyimide-based film has a yellowness index (YI) of 9 or less and a modulus of at least 1.0 GPa.

20. A device comprising the display substrate comprising the polyimide-based film according to claim 1.

* * * * *